United States Patent [19]

Brown

[11] 4,082,055
[45] Apr. 4, 1978

[54] NEUSTON NET APPARATUS
[75] Inventor: Daniel Maitland Brown, San Diego, Calif.
[73] Assignee: Regents of the University of California, Berkeley, Calif.
[21] Appl. No.: 737,785
[22] Filed: Nov. 1, 1976
[51] Int. Cl.² .................. B60P 21/56; B63B 21/64; B63G 8/42
[52] U.S. Cl. ................................ 114/245; 114/244; 43/9
[58] Field of Search ............... 114/16 R, 16 P, 242, 114/244, 245, 253; 43/8, 9, 7, 14, 43.13, 103, 104, 105

[56] References Cited
U.S. PATENT DOCUMENTS

| | | | |
|---|---|---|---|
| 1,959,793 | 5/1934 | Lafredo | 43/9 |
| 2,914,878 | 12/1959 | Persson | 43/43.13 |
| 3,316,670 | 5/1967 | Johnson | 43/9 |
| 3,482,034 | 12/1969 | Rhoades | 114/244 |

FOREIGN PATENT DOCUMENTS

| | | | |
|---|---|---|---|
| 32,661 | 12/1923 | Denmark | 43/9 |
| 1,306,723 | 9/1962 | France | 43/9 |

OTHER PUBLICATIONS
p. 91, Popular Mechanics, Jun. 1945, "Seine."

Primary Examiner—Trygve M. Blix
Assistant Examiner—D. W. Keen
Attorney, Agent, or Firm—Brown & Martin

[57] ABSTRACT

A neuston net apparatus for guiding a net to be towed at the surface of a body of water. Dynamic lift provided by buoyant aquaplanes having trailing edges that are colinear with the top of a frame having a straight rigid top member defining the opening of the net, combines with the drag of the net to maintain the top of the net opening at the water surface when the apparatus is being towed, and thereby enables quantitative data to be obtained. Paravanes combined with an unbalanced bridle yoke steer the apparatus obliquely to the direction in which the apparatus is being towed, so as to steer the apparatus away from the influence of the towing vessel. A weighted tow line attached to the bridle yoke maintains the bridle yoke beneath the opening of the net so as not to scare sea creatures away from the opening and further prevents the net from leaping out of the water at wave tops.

7 Claims, 4 Drawing Figures

NEUSTON NET APPARATUS

BACKGROUND OF THE INVENTION

The present invention is generally directed to apparatus for guiding fishing nets and is particularly directed to a neuston net apparatus for guiding a net to be towed at the surface of a body of water.

Sampling the surface of bodies of water has gained increasing attention in the last few years, and has generated a need for a simple but effective neuston net apparatus that will follow the water surface and yield quantitative data as to populations of marine life near the surface. To obtain such quantitative data it is necessary to measure the quantity of water that has been scanned by the mouth opening of the neuston net into which the marine life has been gathered. Such measurement is typically obtained by a flow meter positioned in the mouth of the net at the opening thereof.

However, difficulty has been experienced in obtaining meaningful measurements when using prior art neuston net apparatus because the opening to the mouth of the net defined by the frame of the apparatus to which the net is attached tends to bounce up and down above and below the water surface as the apparatus is towed with a tow line extending to a towing vessel.

Also with prior art neuston net apparatus the tow line used for towing the apparatus tends to disturb the water surface immediately forward of the opening and thus scares many fast moving sea creatures away from the opening before they can be captured in the net.

It is also important that the neuston net apparatus be steered in such a manner in relation to the vessel towing the apparatus that the apparatus is out of the vessels wake so that the water passing through the opening of the apparatus into the mouth of the net is relatively undisturbed by the wake and does not contain effluent from the vessel. This has been accomplished by prior art net apparatus which includes paravanes and an unbalanced bridle yoke attached to the paravanes for steering the apparatus obliquely to the direction in which the apparatus is being towed, and thereby out of the wake of the towing vessel. However, such prior art neuston net apparatus including paravanes still have the aforementioned shortcomings pertaining to (1) the apparatus opening bouncing above and below the water surface, and (2) tow line disturbance of the water immediately forward of the opening scaring fast moving sea creatures away from the opening.

SUMMARY OF THE INVENTION

The present invention is a neuston net apparatus that includes a frame having a straight rigid top member for defining an opening for attachment to the mouth of a net; buoyant aquaplanes attached to the frame at the sides of the top of the opening and extending forward and outward from the opening for maintaining the top of the opening at the surface of the water; and a tow line coupled to the apparatus to enable the apparatus to be towed, the tow line having a weight attached thereto for maintaining the tow line beneath the opening when the apparatus is being towed. In the preferred embodiment the trailing edges of the aquaplanes are colinear with the top of the opening. When the neuston net apparatus of the present invention lies still in the water the buoyancy of the aquaplanes maintains the top of the opening at the water surface; and when the apparatus is being towed the dynamic lift provided by the aquaplanes combines with the drag provided by the net to maintain the top of the opening at the water surface. By maintaining the top of the opening at the water surface meaningful quantitative data can be obtained with a flow meter positioned in the opening at the mouth of the net.

A towing force with is in a direction parallel to the water surface or at an angle directed above the surface will cause the net apparatus (and thus the top of the opening to the mouth of the net) to leap out of the water at some wave tops. By maintaining the tow line beneath the opening with the attached weight, the towing force acts from below and therefore does not cause the net apparatus to leap above the water surface at wave tops; and also the water immediately forward of the opening is not disturbed by the tow line so as to scare away fast moving creatures before they can be captured in the net. Thus not only can more meaningful quantitative data be obtained, but also the qualitative nature of the sample catch has been improved. Tests of the neuston net apparatus of the present invention have yielded some surprising catches of such fast moving sea creatures as water striders, halobates, baby squid, mackeral and anchovies.

The preferred embodiment of the present invention includes paravanes attached to the frame at the sides of the opening and extending in a plane normal to the plane of the aquaplanes forward from the opening and beneath the aquaplanes for steering the apparatus when the apparatus is being towed. An unbalanced bridle yoke is attached to the paravanes for steering the apparatus obliquely to the direction in which the apparatus is being towed, so as to steer the apparatus outside of such influences of the towing vessel as effluent and the wake which tends to scare sea creatures away. The paravanes are preferably parallel planar panels. Although curved paravanes could be substituted for the combination of paravanes and an unbalanced bridle yoke within the broader concept of the present invention and still provide the desired oblique steering, the parallel planar panels and unbalanced bridle yoke combination is preferred since the preferred apparatus can readily be used on either side of the towing vessel simply by reversing the legs of the bridle yoke, whereas the curved paravane apparatus can be used on only one side of the towing vessel.

In the preferred embodiment, the leading edges of the aquaplanes are rearward of the leading edges of the paravanes so that the contact between the leading edges of the paravanes and the water when the apparatus is being towed does not disturb the water between the paravanes in front of the opening.

The preferred embodiment further includes a sheet attached to the top of the opening and extending forward from the opening between the paravanes, with the leading edge of the sheet being above the plane of the aquaplanes when the apparatus lies still in the water, whereby the sheet is held out of the water for deflecting toward the opening both splashing water and any marine life that has moved above the water surface forward of the opening when the apparatus is being towed. In this embodiment the paravanes further extend above the aquaplanes to the side edges of the sheet to further deflect such splashing water and marine life toward the opening.

DESCRIPTION OF THE PREFERRED EMBODIMENT

Figure 1:
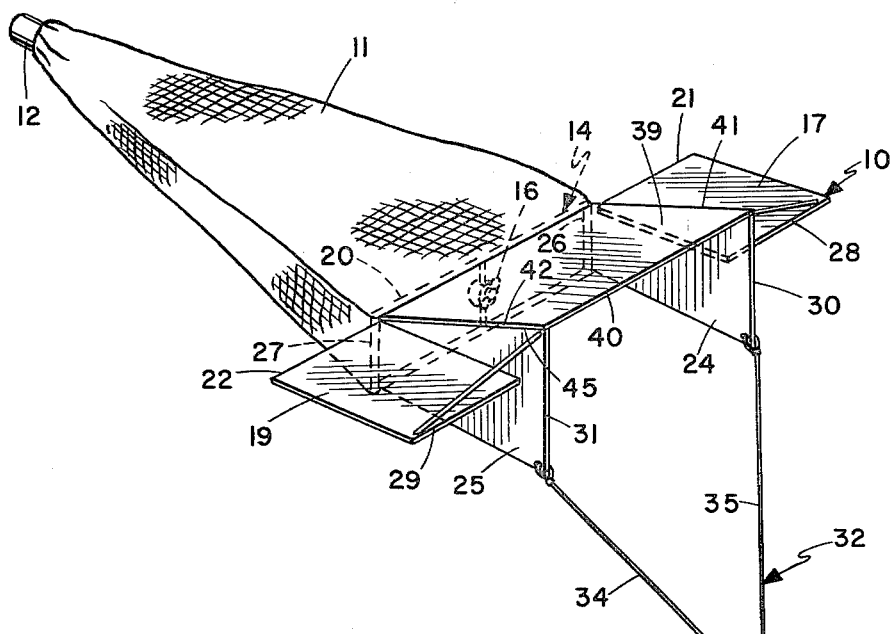
FIG. 1 is a perspective view of the neuston net apparatus with the net attached.
Figure 2:
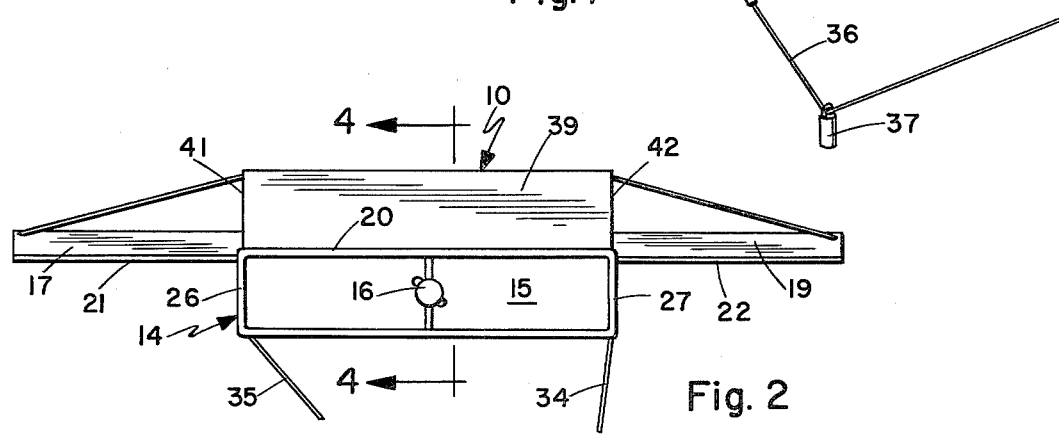
FIG. 2 is a rear elevation view of the apparatus with the net omitted.
Figure 3:
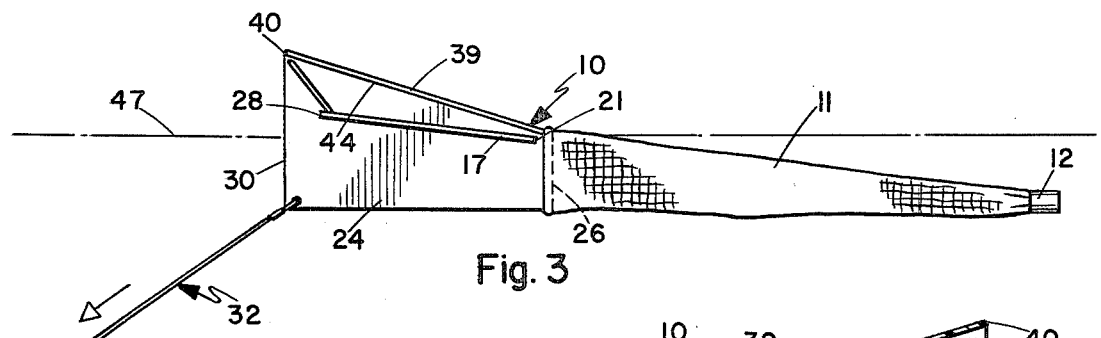
FIG. 3 is a side elevation view of the apparatus in use.
Figure 4:
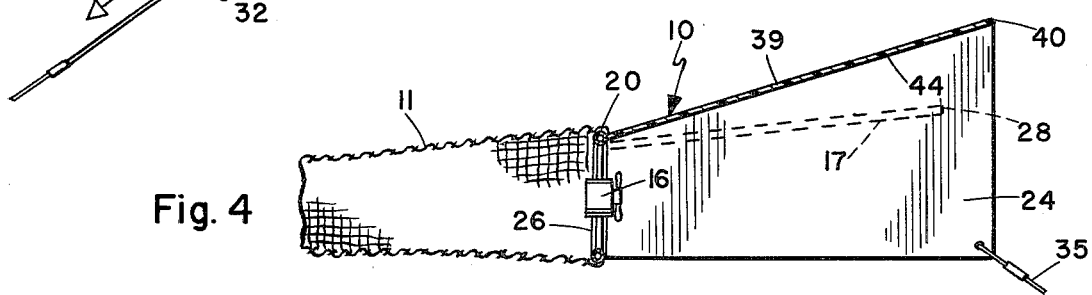
FIG. 4 is an enlarged sectional view taken on line 4—4 of FIG. 2.

Referring to FIGS. 1, 2, 3 and 4, the neuston net apparatus 10 of the present invention is used for guiding a net 11. The net 11 has a container 12 attached to the closed end thereof.

The net apparatus 10 includes a rectangular frame 14 for defining an opening 15 to the mouth of the net 11. The frame 14 preferably is a light weight aluminum tubing. The net 11 is attached to the frame 14 by means of metal bands or bolts (not shown).

A flow meter 16 is positioned in the mouth of the net 11 at the opening 14.

Buoyant aquaplanes 17, 19 are attached to the frame 14 at the sides of the top of the opening 15. The top of the opening 15 is defined by a straight rigid frame member 20. The aquaplanes 17, 19 extend forward and outward from the opening 15. The trailing edges 21, 22 of the aquaplanes 17, 19 are colinear with the frame member 20.

Paravanes 24, 25 are attached to the frame at the sides of the opening 15 as defined by side members 26 and 27. The paravanes 24, 25 are planar parallel panels. The paravanes 24, 25 extend in a plane normal to the plane of the aquaplanes 17, 19. The paravanes 24, 25 extend forward from the opening 15 and beneath the aquaplanes 17, 19. The leading edges 28, 29 of the aquaplanes 17, 19 are rearward of the leading edges 30, 31 of the paravanes 24, 25 so that the contact between the leading edges 28, 29 of the aquaplanes 17, 19 and the water do not disturb the water between the paravanes 24, 25 in front of the opening 15.

The bridle yoke 32 includes a short leg 34 and a long leg 35. The short leg 34 is attached to the lower front corner of one paravane 24 and the long leg 35 is attached to the lower front corner of the other paravane 25.

The tow line 36 is attached to the bridle yoke 32. The tow line 36 has a weight 37 attached thereto for maintaining the bridle yoke 32 beneath the opening 15 when the apparatus 10 is being towed.

The aquaplanes 17, 19 and the paravanes 24, 25 are made of light-weight sheet material such as plywood or fiberglass. The bridle yoke 32 and tow line 36 are made of wire.

The steering angle provided by the bridle yoke 32 is determined by two forces, lift and drag.

Drag is provided primarily by the net 11. Drag is proportional to the towing speed, and to some extent the weight of the catch. The coefficient of drag doesn't vary significantly between the filtering and clogged condition in micron mesh sized netting. Only large mesh netting above 2mm shows any significant change when clogged.

Lift, or the ability of the paravanes 24, 25 to steer the net 11 out away from the towing vessel, has several considerations. Lift force is proportional to speed. However, just as an airplane cannot get off the ground until it is going fast enough the apparatus 10 will not steer away from the ship until it attains at least a certain towing speed. But since the lifting force outward from the towing vessel is countered by the drag of the net 11, a balance is struck between the two forces. If the steering angle is too great, the paravanes 24, 25 will stall. Planar paravane panels are limited to a steering angle in water of between 15° to 20° before stalling. For any fixed steering angle there is an optimum towing speed which yields a maximum distance away from the ship with the least amount of water disturbance.

A sheet 39 attached to the frame member 20 at the top of the opening 15 extends forward from the opening 15 so that its leading edge 40 is above the plane of the aquaplanes 17, 19 when the net apparatus 10 lies still in the water. The side edges 41, 42 of the sheet 39 are attached to the top edges 44, 45 of the paravanes 24, 25 which extend above the aquaplanes 17, 19. The sheet 39 and paravanes 24, 25 deflect splashing water and any marine life that has moved above the water surface 47.

Having described my invention, I now claim:

1. A neuston net apparatus for guiding a net to be towed at the surface of a body of water comprising:

a frame having a straight rigid top member for defining an opening for attachment to the mouth of a net;

buoyant aquaplanes attached to the frame at the sides of the top of said opening and extending forward and outward from said opening for maintaining the top of said opening at the surface of the water by buoyancy when the apparatus lies still in the water and by dynamic lift when the apparatus having a said net attached thereto is being towed;

paravanes attached to the frame at the sides of said opening and extending in a plane normal to the plane of the aquaplanes forward from said opening and beneath the aquaplanes for steering the apparatus when the apparatus is being towed;

an unbalanced bridle yoke attached to the paravanes for steering the apparatus obliquely to the direction in which the apparatus is being towed, a tow line attached to the bridle yoke;

a weight attached to the tow line for maintaining the bridle yoke beneath said opening when the apparatus is being towed; and a sheet attached to the top said opening and extending forward from said opening between the paravanes with the leading edge of the sheet being above the plane of the aquaplanes when the apparatus lies still in the water, whereby the sheet is held out of the water for deflecting toward said opening, splashing water and marine life that has moved above the water surface forward of said opening when the apparatus is being towed.

2. A neuston net according to claim 1, wherein the paravanes further extend above the aquaplanes to the side edges of the sheet to further deflect said splashing water and marine life toward said opening.

3. A neuston net apparatus for guiding a net to be towed at the surface of a body of water comprising:

a frame having a straight rigid top member for defining an opening for attachment to the mouth of a net;

buoyant aquaplanes attached to the frame at the sides of the top of said opening and extending forward and outward from said opening for maintaining the top of said opening at the surface of the water by buoyancy when the apparatus lies still in the water and by dynamic lift when the apparatus having a said net attached thereto is being towed;

paravanes attached to the frame at the sides of said opening and extending in a plane normal to the plane of the aquaplanes forward from said opening and beneath the aquaplanes for steering the apparatus when the apparatus is being towed;

an unbalanced bridle yoke attached to the paravanes for steering the apparatus obliquely to the direction in which the apparatus is being towed, a tow line attached to th bridle yoke; and a weight attached to the tow line for maintaining the bridle yoke beneath said opening when the apparatus is being towed;

wherein the leading edges of the aquaplanes are rearward of the leading edges of the paravanes so that the contact between the leading edges of the aquaplanes and the water when the apparatus is being towed does not disturb the water between the paravanes in front of said opening.

4. A neuston net apparatus for guiding a net to be towed at the surface of a body of water comprising:
   a frame having a straight rigid top member for defining an opening for attachment to the mouth of a net;
   buoyant aquaplanes attached to the frame at the sides of the top of said opening and extending forward and outward from said opening for maintaining the top of said opening at the surface of the water by buoyancy when the apparatus lies still in the water and by dynamic lift when the apparatus having a said net attached thereto is being towed;
   paravanes attached to the frame at the sides of said opening and extending in a plane normal to the plane of the aquaplanes forward from said opening and beneath the aquaplanes for steering the apparatus when the apparatus is being towed;
   an unbalanced bridle yoke attached to the paravanes for steering the apparatus obliquely to the direction in which the apparatus is being towed,
   a tow line attached to the bridle yoke; and
   a weight attached to the tow line for maintaining the bridle yoke beneath said opening when the apparatus is being towed;
   wherein the paravanes are parallel planar panels.

5. A neuston net apparatus for guiding a net to be towed at the surface of a body of water comprising:
   a frame having a straight rigid top member for defining an opening for attachment to the mouth of a net;
   bouyant aquaplanes attached to the frame at the sides of the top of said opening and extending forward and outward from said opening for maintaining the top of said opening at the surface of the water by buoyancy when the apparatus lies still in the water and by the dynamic lift when the apparatus having a said net attached thereto is being towed;
   steering means attached to the frame for steering the apparatus obliquely to the direction in which the apparatus is being towed;
   a tow line attached to the steering means; and
   a weight attached to the tow line for maintaining the bridle yoke beneath the opening when the apparatus is being towed;
   wherein the trailing edges of the aquaplanes are colinear with the top of said opening.

6. A neuston net apparatus for guiding a net to be towed at the surface of a body of water, comprising:
   a frame having a straight rigid top member for defining an opening for attachment to the mouth of a net;
   buoyant aquaplanes attached to the frame at the sides of the top of said opening and extending forward and outward from said opening for maintaining the top of said opening at the surface of the water by buoyancy when the apparatus lies still in the water and by dynamic lift when the apparatus having a said net attached is being towed; and
   towing means coupled to the apparatus to enable the apparatus to be towed, said towing means having a weight attached thereto for maintaining the towing means beneath said opening when the apparatus is being towed;
   wherein the trailing edges of the aquaplanes are colinear with the top of said opening.

7. A neuston net apparatus for guiding a net to be towed at the surface of a body of water, comprising:
   a frame having a straight rigid top member for defining an opening for attachment to the mouth of a net; and
   buoyant aquaplanes attached to the frame at the sides of the top of said opening and extending forward and outward from said opening for maintaining the top of said opening at the surface of the water by buoyancy when the apparatus lies still in the water and by dynamic lift when the apparatus having a said net attached is being towed by towing means maintained beneath said opening;
   wherein the trailing edges of the aquaplanes are colinear with the top of said opening.

* * * * *